United States Patent
Doustaly et al.

(10) Patent No.: US 7,021,634 B2
(45) Date of Patent: Apr. 4, 2006

(54) SEAL DEVICE FOR A COUSCOUS PAN

(76) Inventors: Laurent Doustaly, Chemin Nord Mingaud, 30730 Montpezat (FR); Nehza Doustaly, Chemin Nord Mingaud, 30730 Montpezat (FR)

( * ) Notice: Subject to any disclaimer, the term of this patent is extended or adjusted under 35 U.S.C. 154(b) by 149 days.

(21) Appl. No.: 10/678,864

(22) Filed: Oct. 3, 2003

(65) Prior Publication Data

US 2005/0072320 A1 Apr. 7, 2005

(51) Int. Cl.
*A47J 27/05* (2006.01)

(52) U.S. Cl. ..................... 277/607; 220/573.4

(58) Field of Classification Search ............... 277/607; 220/573.4, 573.5
See application file for complete search history.

(56) References Cited

U.S. PATENT DOCUMENTS 1,593,650 A * 7/1926 Bultman ............... 215/12.1
2,289,497 A * 7/1942 Hons, Jr. ............... 99/292
5,112,065 A * 5/1992 Meyer et al. ............ 277/634

FOREIGN PATENT DOCUMENTS

FR 2719882 A1 * 11/1995
FR 2838038 A1 * 10/2003

OTHER PUBLICATIONS

Perry, Charles; "Amazing Grain"; Oct. 19, 2005; http://modbee.com/life/taste/V-print/story/11369696p-12116737c.html.*

* cited by examiner

*Primary Examiner*—John Kreck
(74) *Attorney, Agent, or Firm*—Egbert Law Offices

(57) ABSTRACT

A seal device for a cooking utensil called couscous pan for preparing couscous, includes a lower part having the shape of a pan and an upper part having the shape of a receptacle with a bottom with holes. It also includes a strip of natural or synthetic plastic, shaped into a tube portion, aimed at externally covering the junction area between the upper part and the lower part of the couscous pan.

4 Claims, 1 Drawing Sheet

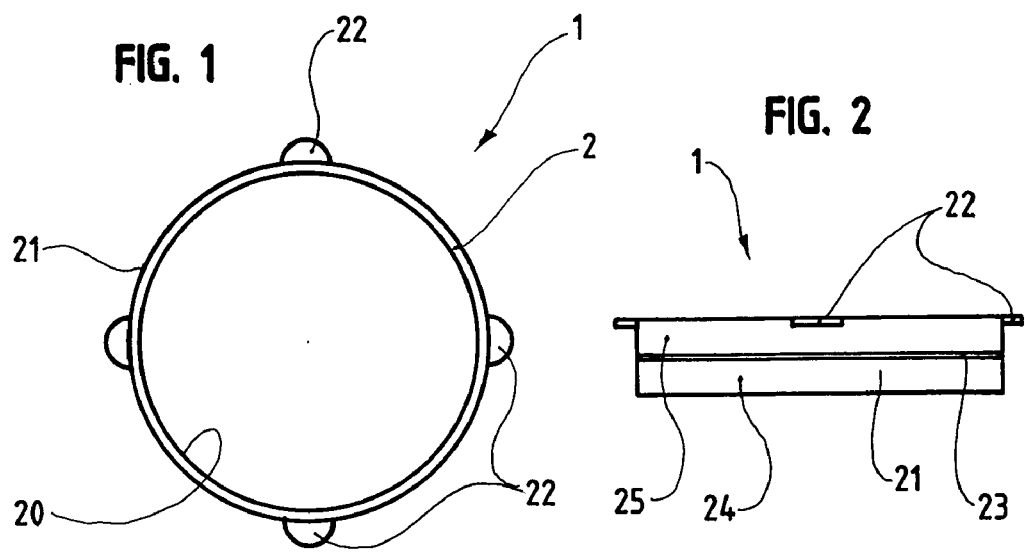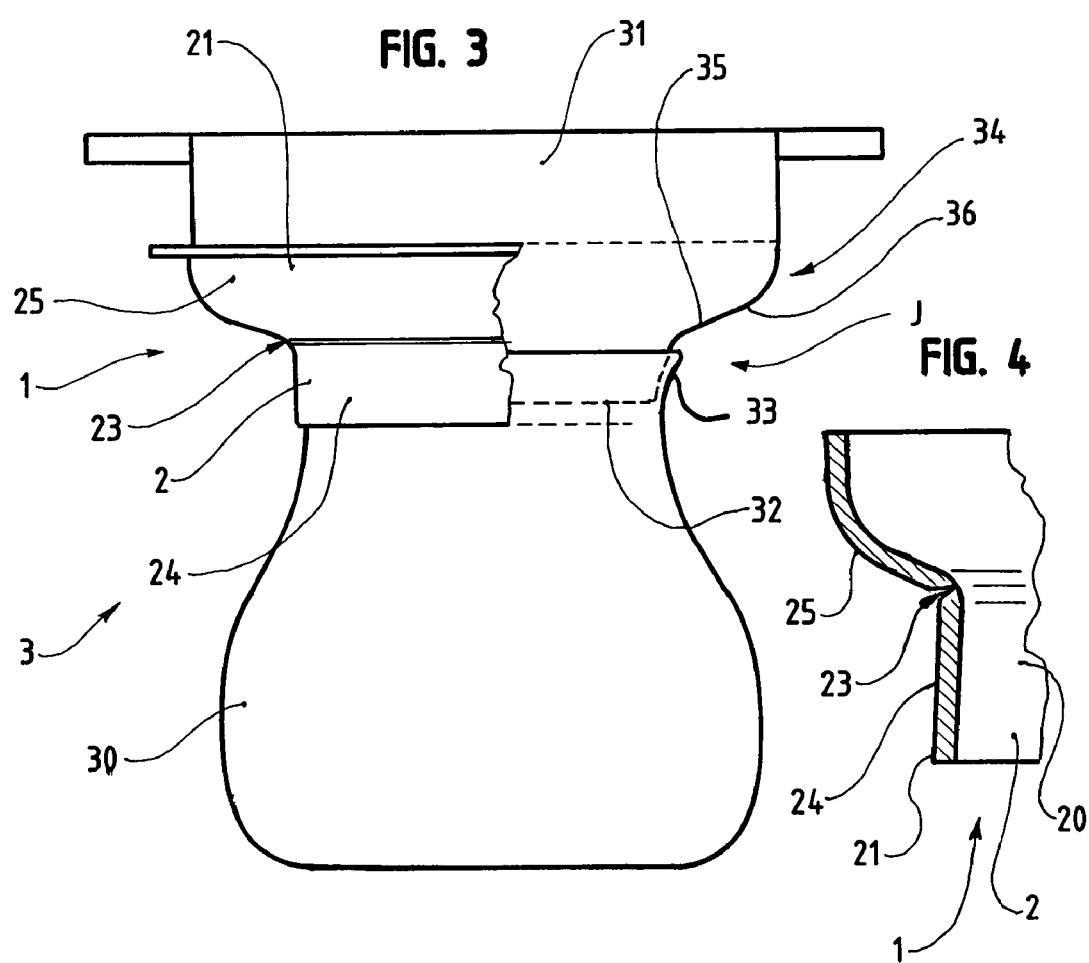

SEAL DEVICE FOR A COUSCOUS PAN

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a seal device for a cooking utensil called a couscous pan for preparing couscous.

BACKGROUND OF THE INVENTION

Traditionally, a couscous pan essentially includes two parts, one part consisting of a pan and an upper part that can be encased on said lower part and consisting of a receptacle with a bottom with openings. The lower part is for cooking the vegetables and the meat entering into the composition of the couscous, while the upper part is for cooking the semolina by means of the vapor proceeding from the lower part.

There are essentially two types of couscous pans, which differ from each other as regards their shape, namely the first one, the traditional one, which includes two parts, an upper one and a lower one, having a curved shape, the cross-section of the upper encasing part having a profile with an S-shaped cross-section, while the second one has a globally cylindrical shape, the lower and upper parts having the same diameter. On the other hand, there exist couscous pans of various capacities and thus of various diameters.

The presently used couscous pans have the drawback of an imperfect tightness between the upper and lower parts, so that a quantity of vapor escapes to the outside and does not pass through the semolina, which then requires a longer cooking time, which can furthermore be prejudicial to the cooking of the vegetables and the meat.

In order to cope with this drawback, the cook generally wraps the upper part of the couscous pan in a piece of preferably wet linen, such as a kitchen towel, which is intercalated between said upper part and the lower part, in order to bring about the tightness. The tightness brought about is however not perfect, namely because it is not easy to perfectly match the outer contour of the cross-section that can be encased of the upper part and the inner contour of the opening of the lower part. In addition, this way of acting can lead to an inflammation of the piece of linen.

BRIEF SUMMARY OF THE INVENTION

The present invention is aimed at providing a seal device for a cooking utensil called couscous pan for preparing couscous, allowing coping with the various above-mentioned drawbacks and which can be adapted to all the existing couscous pans.

The seal device for a cooking utensil called couscous pan for preparing couscous, including a lower part having the shape of a pan and an upper part having the shape of a receptacle with a bottom with holes, according to the invention is essentially characterized in that it consists of a strip of natural or synthetic plastic, shaped into a tube portion, aimed at externally covering the junction area between the upper part and the lower part of the couscous pan.

The plastic strip is sufficiently distortable to allow its adapting to couscous pans of different diameters, so as to match their contour.

According to an additional feature of the device according to the invention, it includes means capable of allowing its adapting to upper parts of varying shapes.

According to a particular embodiment of the device according to the invention, the means capable of allowing its adapting to upper parts of varying shapes consist of at least one external peripheral groove or the like.

Such a groove, or several, favors the wrapping of the lower portion of the upper part when the latter has a curved shape.

According to another additional feature of the device according to the invention, it includes, externally, gripping means.

The gripping means advantageously consist of tongues protruding outwardly.

According to another additional feature of the device according to the invention, it is made of latex or a similar synthetic material.

The advantages and features of the device according to the invention will become clear when reading the following description, with reference to the attached drawing, which represents a non-restrictive embodiment of same.

BRIEF DESCRIPTION OF THE SEVERAL VIEWS OF THE DRAWINGS

FIG. 1 is an elevational view of a seal device according to the invention.

FIG. 2 is a plan view of the same seal.

FIG. 3 is an elevational, partly cross-sectional view of a couscous pan provided with a seal device according to the invention.

FIG. 4 is a schematic partial cross-sectional view of the device according to the invention.

DETAILED DESCRIPTION OF THE INVENTION

When referring to FIGS. 1 and 2, one can see a seal device 1 for a cooking utensil called couscous pan for preparing couscous according to the invention.

This seal device 1 is in the form of a strip 2 of elastic material shaped into a flat ring or, more exactly, into a tube portion, extensible in the diametrical direction.

The strip 2 includes a smooth inner wall 20 and an outer wall 21 from an edge of which protrude outwardly gripping tongues 22, in this case four in number.

When referring now to FIG. 3, one can see a cooking utensil 3 called couscous pan for preparing couscous.

The couscous pan 3 traditionally includes two parts, a lower part 30 consisting of a pan, and an upper part 21 consisting of a receptacle with a bottom with holes, not visible, the base 32 of which has a shape capable of allowing its close encasing into the opening of the lower part 30.

The seal device 1 according to the invention is so arranged on the couscous pan 3 that it covers the junction area (J) between the upper part 31 and the lower part 30, in order to seal the assembly. The seal device 1 also covers the upper end 33 of the lower part 30 and the lower portion 34 of the upper part 31 extending above the base 32.

In the example shown, the couscous pan 3 has a traditional curved shape, i.e. the portion 34 successively has, above the base 32, a concave area 35, then a convex area 36.

Therefore, in order to facilitate the placing and in order to avoid forming folds prejudicial, on the one hand, to the tightness and, on the other hand, to a perfect positioning of the strip 2 on the portion 34, the outer wall 21 of the strip 2 has a peripheral groove 23 that allows the strip 2, as can be seen in FIG. 4, to closely match the curvature of the couscous pan 3 and namely the portion 34.

One should note that it is perfectly possible to provide for further peripheral grooves, whether internal or external grooves, in order for the seal device 1 to be perfectly adaptable to all shapes of couscous pan.

Placing the seal device 1 on the couscous pan 3 can occur as follows, the lower portion 24 of the strip 2, i.e. mainly its portion under the groove 23, is placed on the upper end 33 of the lower part 30, while its upper portion 25 is folded back onto the lower portion 24 for the period of time necessary to place the upper part 31 on the lower part 30. Then, with the help of the gripping tongues 22, the upper portion 25 is brought onto the portion 24 of the upper part 31 of the couscous pan 3.

Removing the seal device 1 obviously occurs by proceeding in the reverse way, here too using the tongues 22.

In the case, not shown, of a couscous pan of a straight type, i.e. having a globally cylindrical shape, in which the upper and lower parts have the same diameter, the seal device 1 suits perfectly, without using the possibilities of the grooves 23.

Irrespective of the couscous pan used, the seal device according to the invention allows ensuring the tightness of the union between the upper and lower portion, so that there is achieved a constant vapor diffusion ensuring a perfect cooking of the semolina.

We claim:

1. An apparatus comprising:
    a couscous pan having a lower part and an upper part, said upper part having a bottom removably received within an opening at a top of said lower part, said couscous pan having a junction between said upper part and said lower part, said lower part being a pan, said upper part being a receptacle with holes formed in said bottom thereof; and
    a seal having a first portion affixed over said top of said lower part and a second portion affixed around said upper part so as to cover said junction, said seal being of a polymeric material and having an annular shape.

2. The apparatus of claim 1, said seal having at least one external peripheral groove formed therearound.

3. The apparatus of claim 1, said seal having a plurality of tongues extending radially outwardly therefrom.

4. The apparatus of claim 1, said seal being formed of a latex material.

* * * * *